United States Patent
Dou et al.

(10) Patent No.: US 11,203,659 B2
(45) Date of Patent: Dec. 21, 2021

(54) METHOD FOR PRODUCING POLYURETHANE, EPOXY CARBOXYLATE COMPOSITION, POLYURETHANE, AND POLYURETHANE RESIN COMPOSITION

(71) Applicant: SHOWA DENKO K. K., Tokyo (JP)

(72) Inventors: Jun Dou, Tokyo (JP); Masahiko Toba, Tokyo (JP); Hiroshi Uchida, Tokyo (JP)

(73) Assignee: SHOWA DENKO K. K., Tokyo (JP)

( * ) Notice: Subject to any disclaimer, the term of this patent is extended or adjusted under 35 U.S.C. 154(b) by 508 days.

(21) Appl. No.: 16/304,931

(22) PCT Filed: May 19, 2017

(86) PCT No.: PCT/JP2017/018900
§ 371 (c)(1),
(2) Date: Nov. 27, 2018

(87) PCT Pub. No.: WO2017/208865
PCT Pub. Date: Dec. 7, 2017

(65) Prior Publication Data
US 2021/0221938 A1  Jul. 22, 2021

(30) Foreign Application Priority Data
May 31, 2016  (JP) .............................. JP2016-109243

(51) Int. Cl.
*C08G 18/58*  (2006.01)
*C08L 75/14*  (2006.01)
(Continued)

(52) U.S. Cl.
CPC ............. *C08G 18/10* (2013.01); *C08G 18/34* (2013.01); *C08G 18/3802* (2013.01);
(Continued)

(58) Field of Classification Search
CPC ..... C08G 18/58; C08G 18/34; C08G 18/6755; C08L 75/14
See application file for complete search history.

(56) References Cited

U.S. PATENT DOCUMENTS 5,663,247 A    9/1997  Sorensen et al.
5,973,034 A   10/1999  Mori et al.
(Continued)

FOREIGN PATENT DOCUMENTS

JP   08325509 A   * 10/1996  ........... C09D 163/00
JP   10-508052 A    8/1998
(Continued)

OTHER PUBLICATIONS

JP-201114062_07-2011_English Translation.*
(Continued)

*Primary Examiner* — Michael L Leonard
(74) *Attorney, Agent, or Firm* — Sughrue Mion, PLLC (57) ABSTRACT

A method for producing a polyurethane according to the present invention including: a first step wherein an epoxy carboxylate compound (X) is obtained by reacting (a) an epoxy compound that includes a halogen atom content of 10 ppm by mass or less, while having only two epoxy groups and no hydroxyl group in each molecule, (b) an unsaturated aliphatic monocarboxylic acid that has an ethylenic unsaturated group in each molecule, while having no aromatic ring, and (c) an aromatic monocarboxylic acid that has no ethylenic unsaturated group in each molecule; and a second step wherein the epoxy carboxylate compound (X) obtained in the first step is reacted with a diisocyanate compound (Y).

13 Claims, 3 Drawing Sheets

(51) Int. Cl.
  *C08G 18/10* (2006.01)
  *C08G 18/34* (2006.01)
  *C08G 18/38* (2006.01)
  *C08G 18/67* (2006.01)

(52) U.S. Cl.
  CPC ......... *C08G 18/58* (2013.01); *C08G 18/6755* (2013.01); *C08L 75/14* (2013.01)

(56) References Cited

U.S. PATENT DOCUMENTS

| | | | |
|---|---|---|---|
| 2009/0081437 A1 | 3/2009 | Mizutani et al. | |
| 2011/0082229 A1* | 4/2011 | Ikegami | C08F 290/06 522/68 |
| 2017/0292009 A1* | 10/2017 | Yoshimura | G02F 1/13363 |

FOREIGN PATENT DOCUMENTS

| | | | |
|---|---|---|---|
| JP | 2011140624 A * | 7/2011 | ............. C08G 18/67 |
| JP | 4750789 B2 | 8/2011 | |
| JP | 5638866 B2 | 12/2014 | |
| JP | 5781406 B2 | 9/2015 | |
| KR | 10-0482253 B1 | 6/2005 | |
| WO | 2010/140527 A1 | 12/2010 | |
| WO | 2013/162015 A1 | 10/2013 | |

OTHER PUBLICATIONS

JP-08325509-A_10-1996_English.*
Notification of Reason for Refusal dated Nov. 8, 2019, issued by the Korean Intellectual Property English Office in corresponding Korean Application No. 10-2018-7029984 Translation.
Jin Won Kim, et al., "Efficient Ring Opening Reaction of Epoxides with Oxygen Nucleophiles Catalyzed by Quaternary Onium Salt", Bulletin of the Korean Chemical Society, 2013, pp. 2286-2290, vol. 34, No. 8.
International Search Report for PCT/JP2017/018900 dated Aug. 15, 2017 [PCT/ISA/210].

* cited by examiner

METHOD FOR PRODUCING POLYURETHANE, EPOXY CARBOXYLATE COMPOSITION, POLYURETHANE, AND POLYURETHANE RESIN COMPOSITION

CROSS REFERENCE TO RELATED APPLICATIONS

This application is a National Stage of International Application No. PCT/JP2017/018900 filed May 19, 2017, claiming priority based on Japanese Patent Application No. 2016-109243 filed May 31, 2016.

TECHNICAL FIELD

The present disclosure relates to a method for producing polyurethane, an epoxy carboxylate composition, polyurethane, and a polyurethane resin composition.

BACKGROUND ART

Conventionally, a polyurethane compound has been used for various uses. For example, in the field of electronic materials, solder resist, materials for disks, film coating materials, etc. Patent Document 1 mentioned below discloses a polyurethane compound used for the solder resist on a flexible substrate. Also, Patent Document 2 discloses a polyurethane compound used for a resin composition for an optical disk. Further, Patent Document 3 discloses a polyurethane compound used for a film coating material.

Patent Document 1 describes that, at the time of synthesizing an epoxy carboxylate (including epoxy acrylate) compound which is a raw material for a polyurethane compound, using an epoxy compound having no hydroxyl group is preferable. However, in general, a cured acrylic film has a drawback that the cure shrinkage is large, which causes the warpage of a substrate when the entire surface thereof is coated. Whereas, in Patent Document 1, coating is applied to a part of a flexible substrate, and there is no evaluation regarding the warpage which occurs when the entire surface is coated. Further, there is no evaluation regarding the solvent resistance.

Also, Patent Document 2 discloses the synthesis of an epoxy carboxylate compound using an epoxy compound having two or more epoxy groups in each molecule, and it is highly probable that the raw material for a polyurethane compound includes an epoxy carboxylate compound having three or more hydroxyl groups. Therefore, there is a drawback that, at the time of synthesizing the polyurethane compound, the viscosity of the raw material increases to make the handling difficult, and the control of polymerization is also made difficult by obtained branched-polyurethane.

Further, Patent Document 3 discloses the use of an epoxy compound having two or more hydroxyl groups, and the use of a (meth)acrylate compound having three or more hydroxyl groups as a raw material for a urethane (meth)acrylate compound. Therefore, according to Patent Document 3, a drawback same as the above-mentioned drawback of Patent Document 2 occurs.

In addition, the above-mentioned conventional polyurethane compound produced by using epoxy (meth)acrylate as a raw material, shows high content of halogen atoms such as chlorine derived from the raw material. Thus, when the polyurethane compound is used, for example, in the field of electronic materials, migration of metal, such as copper, used as a conductive material, may be caused.

PRIOR ARTS

Patent Document

Patent Document 1: Japanese Patent No. 5638866
Patent Document 2: Japanese Patent No. 4750789
Patent Document 3: Japanese Patent No. 5781406

SUMMARY

One of the objectives of the present disclosure is to provide a method for producing polyurethane that is easily handled, is easily controlled in terms of polymerization, and has low halogen content, and that is excellent in adhesiveness to a substrate after being cured, cure shrinkage resistance, and solvent resistance; as well as to provide an epoxy carboxylate composition, a polyurethane, and a polyurethane resin composition.

In order to attain the above objective, the present disclosure comprises the following aspects.

[1] A method for producing polyurethane comprising: a first step of obtaining an epoxy carboxylate compound (X) by reacting an epoxy compound (a) including a halogen atom of 10 mass ppm or less and having only two epoxy groups and no hydroxyl group in each molecule, an unsaturated aliphatic monocarboxylic acid (b) having an ethylenic unsaturated group and having no aromatic ring in each molecule, and an aromatic monocarboxylic acid (c) having no ethylenic unsaturated group in each molecule; and a second step of reacting the epoxy carboxylate compound (X) obtained in the first step with a diisocyanate compound (Y).

[2] A method for producing polyurethane according to [1], wherein, in the first step, reaction is performed under conditions that: the sum of carboxyl groups in the unsaturated aliphatic monocarboxylic acid (b) having an ethylenic unsaturated group and no aromatic ring in each molecule and the aromatic monocarboxylic acid (c) having no ethylenic unsaturated group in each molecule is 0.9 to 1.2 equivalents, relative to 1 equivalent of epoxy groups in the epoxy compound (a); and the ratio of the aromatic monocarboxylic acid (c) having no ethylenic unsaturated group in each molecule, relative to the sum of the unsaturated aliphatic monocarboxylic acid (b) having an ethylenic unsaturated group and no aromatic ring in each molecule and the aromatic monocarboxylic acid (c) having no ethylenic unsaturated group in each molecule, is 20 to 80 mol %.

[3] A method for producing polyurethane according to [1] or [2], wherein, in the second step, the number of isocyanato groups in the diisocyanate compound (Y):the number of hydroxyl groups in the epoxy carboxylate compound (X) is 0.5 to 1.5:1.

[4] A method for producing polyurethane according to any one of [1] to [3], wherein the epoxy compound (a) is an aromatic diglycidyl ether including a halogen atom content of 10 mass ppm or less.

[5] A method for producing polyurethane according to [4], wherein the aromatic diglycidyl ether is bisphenol A diglycidyl ether.

[6] A method for producing polyurethane according to any one of [1] to [5], wherein said unsaturated aliphatic monocarboxylic acid (b) having an ethylenic unsaturated group and no aromatic ring in each molecule is one selected from a group consisting of a (meth)acrylic acid, a crotonic acid, a reaction product of a (meth)acrylic acid with ε-caprolactone, and a half ester which is an equimolar reaction product of a saturated or unsaturated dibasic acid anhydride having no aromatic ring in each molecule with a (meth)acrylate derivative having only a hydroxyl group in each molecule.

[7] A method for producing polyurethane according to any one of [1] to [6], wherein the aromatic monocarboxylic acid (c) having no ethylenic unsaturated group in each molecule is a monocarboxylic acid having an aromatic skeleton with a carbon atom number of 6 to 30.

[8] A method for producing polyurethane according to any one of [1] to [7], wherein the diisocyanate compound (Y) comprises an alicyclic compound having 6 to 30 carbon atoms except for isocyanato group (—NCO group).

[9] An epoxy carboxylate composition containing a first epoxy carboxylate compound and a second epoxy carboxylate compound which are represented by the following formula (1):

(1)

(in the formula, A represents an organic residue derived from a diglycidyl ether and having no hydroxyl group; and $R^1$, $R^2$ each independently represents an aromatic ring which has a carbon atom number of 6 to 30 and may have a substituent, or an organic group represented by the formula (2);

in the first epoxy carboxylate compound, at least one of $R^1$ and $R^2$ being an aromatic ring which has a carbon atom number of 6 to 30 and may have a substituent;

in the second epoxy carboxylate compound, at least one of $R^1$, $R^2$ being an organic group represented by the formula (2); and the first epoxy carboxylate compound being different from the second epoxy carboxylate compound);

$H_2C=CR^3—$ (2)

(in the formula, $R^3$ represents a hydrogen atom or a methyl group).

[10] Polyurethane comprising a first urethane bond unit between a first epoxy carboxylate compound represented by the following formula (1) and a diisocyanate compound (Y), and a second urethane bond unit between a second epoxy carboxylate compound represented by the formula (1) and the diisocyanate compound (Y)

(1)

(in the formula, A represents an organic residue derived from a diglycidyl ether and having no hydroxyl group; and $R^1$, $R^2$ each independently represents an aromatic ring which has a carbon atom number of 6 to 30 and may have a substituent, or an organic group represented by the formula (2);

in the first epoxy carboxylate compound, at least one of $R^1$ and $R^2$ being an aromatic ring which has a carbon atom number of 6 to 30 and may have a substituent;

in the second epoxy carboxylate compound, at least one of $R^1$, $R^2$ being an organic group represented by the formula (2); and the first epoxy carboxylate compound being different from the second epoxy carboxylate compound);

$H_2C=CR^3—$ (2)

(in the formula, $R^3$ represents a hydrogen atom or a methyl group).

[11] A polyurethane resin composition comprising the polyurethane according to [10] and a photoinitiator.

EFFECT OF THE INVENTION

According to the present disclosure, polyurethane that is easily handled, is easily controlled in terms of polymerization, and has low halogen content, and that is excellent in adhesiveness to a substrate after being cured, cure shrinkage resistance, and solvent resistance, can be produced.

ASPECT OF DISCLOSURE

Hereinbelow, an aspect of the present disclosure (hereinbelow, referred to as an aspect) will be explained.

One of the characteristics of a method for producing polyurethane according to an aspect of the present disclosure is that the method comprises a first step wherein an epoxy carboxylate compound (X) is obtained by reacting: an epoxy compound (a) including a halogen atom content of 10 mass ppm or less, and having only two epoxy groups and no hydroxyl group in each molecule (hereinafter, may be simply referred to as an epoxy compound (a)), an unsaturated aliphatic monocarboxylic acid (b) having an ethylenic unsaturated group and no aromatic ring in each molecule (hereinafter, may be simply referred to as an unsaturated aliphatic monocarboxylic acid (b)), and an aromatic monocarboxylic acid (c) having no ethylenic unsaturated group in each molecule (hereinafter, may be simply referred to as an aromatic monocarboxylic acid (c)); and a second step wherein the epoxy carboxylate compound (X) obtained in the first step is reacted with a diisocyanate compound (Y).

Here, the halogen atoms are primarily chlorine atoms and bromine atoms. Accordingly, the feature that the halogen atom content is 10 mass ppm or less means that the sum of the total chlorine atom concentration and the total bromine atom concentration relative to the total amount of the epoxy compound (a) is 10 mass ppm or less. Since the epoxy compound (a), which is a raw material, includes a halogen atom content of 10 mass ppm or less, the polyurethane synthesized therefrom can include a halogen atom content of 50 mass ppm or less. Therefore, when the polyurethane is used in the field of electronic materials, migration of metal such as copper, which is used for conductive materials, can be largely suppressed. In the present specification, the halogen atom content refers to a value measured in accordance with JIS K7243-3.

Further, the epoxy compound (a) which is a raw material for the epoxy carboxylate compound (X), has a good handleability because of its low viscosity (approximately 5 to 6 Pa·s), the low viscosity being achieved because the epoxy compound (a) has no hydroxyl group in each molecule, and thus, there are only a few intermolecular hydrogen bonds. The epoxy carboxylate compound (X) used in the present aspect has a viscosity at 25° C. of 400 to 700 Pa·s. In Synthesis Examples mentioned below, viscosities are measured by a rotational rheometer MCR301 manufactured by Anton Paar, under the conditions of 5 rpm.

<Synthesis of Epoxy Carboxylate Compound (X): First Step>

There is no special limitation for the epoxy compound (a) having only two epoxy groups and no hydroxyl group in each molecule, and used for synthesizing the epoxy carboxylate compound (X). Examples of the epoxy compound (a) include: aromatic diglycidyl ether compounds comprising bisphenol-based diglycidyl ethers such as bisphenol-A diglycidyl ether, bisphenol-F diglycidyl ether, bisphenol-S diglycidyl ether, bisphenol fluorene diglycidyl ether, etc., and biphenyl-based glycidyl ethers such as biphenol diglycidyl ether, tetramethyl biphenol glycidyl ether, etc., and the like; saturated hydrocarbon diglycidyl ether compounds comprising alkyldiol diglycidyl ethers such as hexanediol diglycidyl ether, etc., alkylene glycol diglycidyl ethers such as polyethylene glycol diglycidyl ether, etc., cycloalkyldiol diglycidyl ethers such as cyclohexanediol diglycidyl ether, hydrogenerated bisphenol-A diglycidyl ether; etc., and the like; and what are referred to as bifunctional alicyclic epoxy compounds such as 3,4-epoxycyclohexenylmethyl-3',4'-epoxycyclohexenecarboxylate (CELLOXIDE 2021, manufactured by Daicel Corporation), 1,2,8,9-diepoxylimonene (CELLOXIDE 3000, manufactured by Daicel Corporation), and the like. Further, preferably, the epoxy compound (a) may not have either the hydroxyl groups or other functional groups having active hydrogen which easily react with carboxyl groups, mercapto groups, and isocyanato groups, for the purpose of preventing gelation of polyurethane in the below-mentioned second step.

Among them, in view of the adhesiveness between the resulting polyurethane and the substrate, aromatic diglycidyl ether compounds are preferable, and bisphenol A diglycidyl ether is more preferable. When a substrate having an aromatic ring in each molecule, such as polyethylene terephthalate (PET), polyethylene naphthalate (PEN), aromatic polyimide (PI), etc., is used, using aromatic diglycidyl ether compounds having an aromatic ring in each molecule can increase the adhesiveness between the substrate and the resulting polyurethane because of the n interaction between the aromatic ring of the substrate and the aromatic ring of the polyurethane. These epoxy compounds (a) can be produced by, for example, a method described in Japanese Patent No. 5800709, wherein hydrogen peroxide is used as an oxidizer for an organic compound having two carbon-carbon double bonds to epoxidize the carbon-carbon double bonds. In this method, epihalohydrin is not used as a raw material, and thus, an epoxy compound (a) having substantially no halogen atom in the skeleton of each molecule, can be obtained. Accordingly, an epoxy compound (a) having a low halogen atom content can be obtained without an advanced purification. The content of halogen atoms in the epoxy compound (a) is preferably 10 mass ppm or less as mentioned above, and more preferably 8 mass ppm or less. If the content of halogen atoms in the epoxy compound (a) is 10 mass ppm or less, the content of halogen atoms in the resulting polyurethane can be suppressed to 50 mass ppm or less, more preferably 40 mass ppm or less, and still more preferably 30 mass ppm or less.

The unsaturated aliphatic monocarboxylic acid (b) used for synthesizing the epoxy carboxylate compound (X) introduces an ethylenic unsaturated group to the polyurethane produced according to the present aspect, and converts the epoxy compound (a) to a diol compound which can react with an isocyanato group. The number of ethylenic unsaturated groups in the unsaturated aliphatic monocarboxylic acid (b) is preferably 1 to 4.

Examples of such unsaturated aliphatic monocarboxylic acids (b) include (meth)acrylic acids, crotonic acids, and the like. In the present specification the expression "(meth)acrylic acid" refers to an acrylic acid and a methacrylic acid, the expression "(meth)acrylate" refers to an acrylate and a methacrylate, and the expression "(meth)acryloyl" refers to an acryloyl and a methacryloyl, respectively.

Examples of (meth)acrylic acids include a (meth)acrylic acid, a reaction product of a (meth)acrylic acid and ε-caprolactone, a half ester which is an equimolar reaction product of a saturated or unsaturated dibasic acid anhydride having no aromatic ring in each molecule and a (meth)acrylate derivative having only a hydroxyl group in each molecule, and the like.

Among them, (meth)acrylic acids are preferable because they can be easily obtained. When a (meth)acrylic acid is used, the resultant epoxy carboxylate compound (X) is an epoxy (meth)acrylate.

Together with the unsaturated aliphatic monocarboxylic acid (b), the aromatic monocarboxylic acid (c) used for synthesizing the epoxy carboxylate compound (X) converts the epoxy compound (a) to a diol compound which can react with an isocyanato group, and contributes to reduce cure shrinkage of the resulting polyurethane. When a part of the unsaturated aliphatic monocarboxylic acid (b) is substituted by the aromatic monocarboxylic acid (c), the amount of ethylenic unsaturated group to be introduced to the resulting polyurethane decreases, and thus, the cure shrinkage can be suppressed. Further, the amount of aromatic ring to be introduced to the resulting polyurethane increases, and thus, when a substrate having an aromatic ring in a molecule is used, the adhesiveness between the polyurethane and the substrate increases due to the n interaction of the aromatic rings.

Preferably, the aromatic monocarboxylic acid (c) is a monocarboxylic acid having an aromatic skeleton with a carbon atom number of 6 to 30, and having no ethylenically unsaturated bond. Namely, a monocarboxylic acid having, as an aromatic skeleton, a benzene ring or a fused ring with a naphthalene skeleton, an anthracene skeleton, etc., which may have an alkyl group with carbon atom number of 1 to 6, an alkoxy group with carbon atom number of 1 to 6, etc., as a substituent which has no ethylenic unsaturated group, is preferable. Examples of the aromatic monocarboxylic acid (c) include alkyl-substituted benzenecarboxylic acids such as benzoic acid, toluic acid, t-butylbenzoic acid, mesitylenic acid (dimethylbenzoic acid), etc.; alkoxy-substituted benzenecarboxylic acids such as anisic acid, dimethylanisic acid, ethoxybenzoic acid, trimethoxybenzoic acid, etc.; phenoxybenzoic acid; benzyloxybenzoic acid; fused ring carboxylic acids such as naphthoic acid, methoxynaphthoic acid, anthroic acid; and the like. The substituent may be an alkyl group having a carbon atom number of 1 to 6, an alkoxy group having a carbon atom number of 1 to 6, and the like.

A method for obtaining the epoxy carboxylate compound (X) by reacting the epoxy compound (a), the unsaturated aliphatic monocarboxylic acid (b), and the aromatic monocarboxylic acid (c) is as follows (Carboxylation Reaction: First Step).

A preferable condition is that 1 equivalent of epoxy groups in the epoxy compound (a) is reacted with 0.9 to 1.2 equivalents of carboxyl groups in the sum of the unsaturated aliphatic monocarboxylic acid (b) and the aromatic monocarboxylic acid (c). In this range, production can be performed under relatively stable conditions. If the total charge of the unsaturated aliphatic monocarboxylic acid (b) and the aromatic monocarboxylic acid (c) is more than this range, the unsaturated aliphatic monocarboxylic acid (b) having a carboxyl group and the aromatic monocarboxylic acid (c) having a carboxyl group remain, leading to a drawback that the solvent resistance of a coated film after being cured is decreased. If the total charge is too small, unreacted epoxy compound (a) remains, leading to lowering the stability of the resulting polyurethane. The total charge is more preferably 0.95 to 1.15 equivalent, and still more preferably 1.0 to 1.1 equivalents.

Further, the ratio of the aromatic monocarboxylic acid (c) in the total of the unsaturated aliphatic monocarboxylic acid (b) and the aromatic monocarboxylic acid (c) is preferably 20 to 80 mol %, and more preferably 25 to 75 mol. If the aromatic monocarboxylic acid (c) is 20 mol % or more, cure shrinkage of the finally resulting polyurethane can be suppressed, and the warpage of the substrate can be made smaller. Further, if the aromatic monocarboxylic acid (c) is 80 mol % or less, a preferable solvent resistance can be obtained due to the curing reaction of the (meth)acryloyl group.

The carboxylation reaction can be performed under a solvent-free condition or by using a solvent. When a solvent is used, the solvent to be used is not limited as far as the solvent has no influence on the carboxylation reaction.

When the solvent is used, the amount of the solvent should be appropriately adjusted in accordance with the viscosity or the use of the product. The solvent may be used so that solids content is preferably 99 to 30 mass %, and more preferably 99 to 45 mass %. When the compound to be used in the reaction has a high viscosity, the viscosity can be lowered, leading to a preferable progress of the reaction.

For the solvent, solvents which can also be used for the next step, i.e., for the urethane resin production, is particularly preferable, examples of such solvents being ester-based solvents, ether-based solvents, ketone-based solvents, and the like Examples of the ester-based solvents include: alkyl acetates such as ethyl acetate, propyl acetate, butyl acetate, etc.; cyclic esters such as γ-butyrolactone, etc.; mono- or poly-alkylene glycol monoalkyl ether monoacetates, such as ethylene glycol monomethyl ether monoacetate, diethylene glycol monomethyl ether monoacetate, diethylene glycol monoethyl ether monoacetate, triethylene glycol monoethyl ether monoacetate, diethylene glycol monobutyl ether monoacetate, propylene glycol monomethyl ether monoacetate, butylene glycol monomethyl ether monoacetate, etc.; and the like.

Examples of the ether-based solvent include: alkyl ethers such as diethyl ether, ethyl butyl ether, etc.; glycol ethers such as ethylene glycol dimethylether, ethylene glycol diethyl ether, dipropylene glycol dimethylether, dipropylene glycol diethyl ether, triethylene glycol dimethylether, triethylene glycol dibutyl ether, etc.; cyclic ethers such as tetrahydrofuran, etc.; and the like.

Examples of the ketone-based solvent include acetone, methyl ethyl ketone, cyclohexanone, isophorone, and the like.

Among them, a solvent having a boiling point of 80° C. or higher and 350° C. or lower is preferable, and a solvent having a boiling point of 100° C. or higher and 300° C. or lower is more preferable. When the boiling point is 80° C. or higher, the high boiling point of the solvent can make it easier to reach a reaction temperature at which the carboxylation reaction can progress smoothly. Also, when the temperature of the solvent is not too high (350° C. or lower), the solvent can be removed during a shorter time in the subsequent steps, which is industrially advantageous.

In the carboxylation reaction, using a catalyst is preferable, in order to accelerate the reaction. When the catalyst is used, the amount of use is approximately 0.1 to 3 mass % relative to the total amount of the epoxy compound (a), the unsaturated aliphatic monocarboxylic acid (b), and the aromatic monocarboxylic acid (c), and the solvent when the solvent is used. In this case, the reaction temperature 60 to 150° C., and the reaction time is preferably 5 to 60 hours.

For the catalyst, a catalyst having no halogen is preferable, which may be a general basic catalyst such as triethylamine, benzyldimethylamine, triphenylphosphine, zirconium octanoate, etc.

Further, a thermal polymerization inhibitor may be used. For the heat polymerization inhibitor using, for example, phenothiazine, hydroquinone monomethyl ether, 2-methyl hydroquinone, hydroquinone, diphenyl picrylhydrazine, diphenylamine, 3,5-di-t-butyl-4-hydroxytoluene, etc., is preferable.

During the carboxylation reaction, sampling is appropriately performed, and the acid value of the sample becomes 5 mg KOH/g or lower, and preferably 2 mg KOH/g or lower, the carboxylation reaction is complete.

In the present specification, the acid value refers to a value measured according to the following method.

Approximately 0.2 g of sample is precisely weighed, by a precise balance, in a 100 ml Erlenmeyer flask, and a 10 ml mixture solvent of ethanol/toluene=½ (mass ratio) is added thereto to dissolve the sample. In addition, 1 to 3 drops of phenolphthalein ethanol solution is added to this container as an indicator, and the mixture is sufficiently stirred until the sample is uniformly mixed. The resultant is titrated with a 0.1 N potassium hydroxide-ethanol solution, and when the indicator continues to be slight red for 30 seconds, neutralization is terminated. The value obtained from the results using the below calculation formula is treated as an acid value of the resin.

$$\text{Acid Value (mgKOH/g)}=[B \times f \times 5.611]/S$$

B: Use amount of 0.1 N potassium hydroxide-ethanol solution (ml)
f: Factor of 0.1 N potassium hydroxide-ethanol solution
S: Weighed quantity of sample (g)

In the above-mentioned synthesis of the epoxy carboxylate compound (X), a mixture of a (meth)acrylic acid, i.e., the unsaturated aliphatic monocarboxylic acid (b), and the aromatic monocarboxylic acid (c), as a carboxylic acid component, is reacted with aromatic diglycidyl ether, i.e., the epoxy compound (a). As a result, three kinds of compounds are generated, and an epoxy carboxylate composition containing at least a first epoxy carboxylate compound represented by the following Formula (1) and a second epoxy carboxylate compound, is generated.

In Formula (1), A represents an organic residue derived from diglycidyl ether, and has no hydroxyl group. $R^1$ and $R^2$ each independently represents an aromatic ring which has a carbon atom number of 6 to 30 and may have a substituent, or an organic group represented by the Formula (2). In the first epoxy carboxylate compound, at least either $R^1$ or $R^2$ is an aromatic ring which has a carbon atom number of 6 to 30 and may have a substituent, whereas, in the second epoxy carboxylate compound at least either $R^1$ or $R^2$ is an organic group represented by the Formula (2), and the first epoxy carboxylate compound is different from the second epoxy carboxylate compound. The above-mentioned aromatic ring which has a carbon atom number of 6 to 30 and may have a substituent, corresponds to the aromatic ring having a carbon atom number of 6 to 30 of the aromatic monocarboxylic acid (c). Namely, the aromatic ring may have a substituent having no ethylenic unsaturated group. Specifically, the aromatic ring is a benzene ring, a fused ring having a naphthalene skeleton, an anthracene skeleton, etc., or the like, which may have an alkyl group with a carbon atom number of 1 to 6, an alkoxy group with a carbon atom number of 1 to 6, etc., as a substituent which has no ethylenic unsaturated group.

$$H_2C=CR^3— \quad (2)$$

In Formula (2), $R^3$ represents a hydrogen atom or a methyl group.

More specifically, the reaction where bisphenol A-diglycidyl ether is used for as the epoxy compound (a), an acrylic acid is used as the unsaturated aliphatic monocarboxylic acid (b), and a benzoic acid is used as the aromatic monocarboxylic acid (c), is as follows. The resulting epoxy carboxylate compound (X) contains: a compound 1 wherein both of two glycidyl ether groups are reacted with acrylic acids, respectively; a compound 2 wherein both of two glycidyl ether groups are reacted with benzoic acids, respectively; and a compound 3 wherein one of the two glycidyl ether groups is reacted with an acrylic acid, the other is reacted with a benzoic acid, respectively. The epoxy carboxylate compound (X) containing these three compounds is reacted with the diisocyanate compound (Y) mentioned below. Thereby, polyurethane containing: a second urethane bond unit between the compound 1 (corresponding to the second epoxy carboxylate compound) and the diisocyanate compound (Y); a first urethane bond unit between the compound 2 (corresponding to the first epoxy carboxylate compound) and the diisocyanate compound (Y); and a third urethane bond unit between the compound 3 (corresponding to the first or second epoxy carboxylate compound) and the diisocyanate compound (Y), is obtained.

Using the epoxy carboxylate compound (X) having an aromatic ring with a carboxylate skeleton, as a dihydroxy compound, for the synthesis of polyurethane mentioned below, will contribute to increase the adhesiveness between the resulting polyurethane and the substrate made of polyethylene terephthalate (PET), polyethylene naphthalate (PEN), aromatic polyimide (PI), etc., having an aromatic ring in each molecule, and also increase the cure shrinkage resistance of polyurethane.

<Synthesis of Polyurethane: Second Step>

Examples of the diisocyanate compound (Y) include an aliphatic diisocyanate, an alicyclic diisocyanate, an aromatic diisocyanate, an aromatic-aliphatic diisocyanate, and the like. As far as the synthesized polyurethane is not gelatinized, a small amount of polyisocyanate having three or more isocyanato groups, such as a triphenylmethane triisocyanate, may be used.

Examples of the aliphatic diisocyanate include 1,3-trimethylene diisocyanate, 1,4-tetramethylene diisocyanate, 1,6- hexamethylene diisocyanate, 1,9-nonamethylene diisocyanate, 1,10-decamethylene diisocyanate, 2,2,4-trimethyl hexamethylene diisocyanate, 2,4,4-trimethyl hexamethylene diisocyanate, lysine diisocyanate, 2,2'-diethyl ether diisocyanate, dimer acid diisocyanate, etc.

Examples of the alicyclic diisocyanate include 1,4-cyclohexane diisocyanate, 1,3-bis(isocyanatomethyl)cyclohexane, 1,4-bis(isocyanatomethyl)cyclohexane, 3-isocyanatomethyl-3,5,5-trimethyl cyclohexyl isocyanate (IPDI, isophorone diisocyanate), bis-(4-isocyanato cyclohexyl) methane (dicyclohexylmethane 4,4'-diisocyanate, hydrogenated MDI), hydrogenated (1,3- or 1,4-) xylylene diisocyanate, norbornane diisocyanate, methylene bis(4-cyclohexylisocyanate), etc.

Examples of the aromatic diisocyanate include 2,4'-diphenylmethane diisocyanate, 4,4'-diphenylmethane diisocyanate, 1,4-phenylene diisocyanate, 2,4-tolylene diisocyanate, 2,6-tolylene diisocyanate, (1,2, 1,3, or 1,4)-xylene diisocyanate, 3,3'-dimethyl-4,4'-diisocyanato biphenyl, 3,3'-dimethyl-4,4'-diisocyanato diphenylmethane, 1,5-naphthylene diisocyanate, 4,4'-diphenyl ether diisocyanate, tetrachlorophenylene diisocyanate, etc.

Examples of the aromatic-aliphatic diisocyanate include 1,3-xylylene diisocyanate, 1,4-xylylene diisocyanate, α,α,α',α'-tetramethyl xylylene diisocyanate, 3,3'-methylene ditolylene-4,4'-diisocyanate, etc. These diisocyanates can be used in solo or in combination of two or more kinds.

Since an alicyclic compound having 6 to 30 carbon atoms except for isocyanato group (—NCO group) is used as the diisocyanate compound (Y), a protection film made of a polyurethane resin according to the below-mentioned Examples has a high reliability particularly at high temperature and high humidity, and is suitable for components of electronic devices.

The content of the alicyclic compound in the diisocyanate compound (Y) is 30 mol % or more, preferably 50 mol % or more, and still more preferably 70 mol % or more, relative to the total amount (100 mol %) of the diisocyanate compound (Y).

The polyurethane according to the present aspect may be synthesized from the component (X) and the component (Y), only. However, for the purpose of further applying a radical polymerization property or a cationic polymerization property to this polyurethane, or for the purpose of suppressing the influence from residues of an isocyanato group or a hydroxyl group at the end of polyurethane, a monohydroxy compound (Z) and/or a monoisocyanate compound (W) may be further reacted and synthesized.

Monohydroxy Compound (Z)

Examples of the monohydroxy compound (Z) include compounds having a radical polymerizable double bond such as 2-hydroxyethyl (meth)acrylate, hydroxypropyl (meth)acrylate, hydroxybutyl (meth)acrylate, cyclohexanedimethanol mono(meth)acrylate, caprolactone or alkylene oxide adduct of each of the above (meth)acrylates, glycerin di(meth)acrylate, trimethylol di(meth)acrylate, pentaerythritol tri(meth)acrylate, dipentaerythritol penta(meth)acrylate, ditrimethylolpropane tri(meth)acrylate, allyl alcohol, allyloxy ethanol, etc., and compounds having a carboxylic acid such as a glycol acid, a hydroxypivalic acid, etc.

The monohydroxy compound (Z) can be used in solo or in combination of two or more kinds. Among these compounds, 2-hydroxyethyl (meth)acrylate, hydroxypropyl (meth)acrylate, hydroxybutyl (meth)acrylate, allyl alcohol, glycol acid, hydroxypivalic acid, are preferable, and 2-hydroxyethyl (meth)acrylate and 4-hydroxybutyl (meth)acrylate are more preferable.

In addition, the monohydroxy compound (Z) may also be methanol, ethanol, n-propanol, isopropanol, n-butanol, isobutanol, sec-butanol, t-butanol, amyl alcohol, hexyl alcohol, octyl alcohol, and the like.

Monoisocyanate Compound (W)

Examples of the monoisocyanate compound (W) include (meth)acryloyloxyethyl isocyanate, phenyl isocyanate, hexyl isocyanate, dodecyl isocyanate, Karenz MOI (registered trademark), Karenz AOI (registered trademark), Karenz BEI (registered trademark) (manufactured by Showa Denko K. K.), and the like.

The polyurethane according to the present aspect can be synthesized by reacting the epoxy carboxylate compound (X) and the diisocyanate compound (Y), and further, monohydroxy compound (Z) and/or monoisocyanate compound (W) in accordance with needs, in the presence or absence of a known urethane catalyst such as a metal catalyst of dibutyltin dilaurate, zirconium tetraacetylacetonate, etc., using an appropriate organic solvent.

The organic solvent is not limited as far as the reactivity with an isocyanate compound is low. A solvent having no basic functional group, such as amine, etc., is preferable. Examples of such solvent include toluene, xylene, ethylbenzene, nitrobenzene, cyclohexane, isophorone, diethylene glycol dimethylether, ethylene glycol diethyl ether, ethylene glycol monomethyl ether monoacetate, propylene glycol monomethyl ether monoacetate, propylene glycol monoethyl ether monoacetate, dipropylene glycol monomethyl ether monoacetate, diethylene glycol monoethyl ether monoacetate, methyl methoxypropionate, ethyl methoxypropionate, methyl ethoxypropionate, ethyl ethoxypropionate, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, γ-butyrolactone, dimethyl sulfoxide, chloroform, and methylene chloride, etc.

Further, an organic solvent having a low solubility of the resulting polyurethane is not preferable. Among them, propylene glycol monomethyl ether monoacetate, propylene glycol monoethyl ether monoacetate, dipropylene glycol monomethyl ether monoacetate, diethylene glycol monoethyl ether monoacetate, γ-butyrolactone are particularly preferable.

The order of adding raw materials is not particulary restricted, but, ordinarily, the epoxy carboxylate compound (X) is added first in a reaction container, and dissolved in the solvent, and thereafter, the diisocyanate compound (Y) dropped thereinto at 20 to 150° C., and more preferably 60 to 120° C., and then, reacted at 30 to 160° C., and more preferably 50 to 130° C., for generally 2 to 15 hours. The reaction may be performed under an air atmosphere, but may also be performed under an inert atmosphere such as a nitrogen gas atmosphere.

The molar ratio of the raw materials to be added may be adjusted in accordance with an aimed molecular weight and acid value of polyurethane. Specifically, the molar ratio of them to be added is (isocyanato group in the diisocyanate compound (Y)):(hydroxyl group in the epoxy carboxylate compound (X)) being 0.5 to 1.5:1, preferably 0.8 to 1.2:1, and more preferably 0.95 to 1.05:1.

When the monohydroxy compound (Z) is introduced in the polyurethane, the amount of the diisocyanate compound (Y) should exceed the amount of the epoxy carboxylate compound (X) (i.e., the total amount of isocyanato groups exceeds the total amount of hydroxyl groups), so that the polyurethane molecule has an isocyanato group at the end thereof.

When the monohydroxy compound (Z) is used, preferably, the molar number of the diisocyanate compound (Y) exceeds the molar number of the epoxy carboxylate compound (X), and the monohydroxy compound (Z) is used in 0.5 to 1.5 times molar amount, and preferably 0.8 to 1.2 times molar amount, relative to the excess molar number of the isocyanato group. If the molar amount of the monohydroxy compound (Z) is 0.5 times molar amount or more, the isocyanato groups at the end of polyurethane can be reduced, and if the molar amount is 1.5 times molar amount or less, adverse effects to the subsequent steps caused by the remaining unreacted monohydroxy compound (Z) can be prevented.

In order to introduce the monohydroxy compound (Z) to polyurethane, when the reaction between the epoxy carboxylate compound (X) and the diisocyanate compound (Y) is almost complete, in order to make the isocyanato groups remaining at both ends of the polyurethane react with the monohydroxy compound (Z), the monohydroxy compound (Z) is dropped into the reaction solution at 20 to 150° C., more preferably 70 to 120° C., and thereafter, the same temperature is maintained until the reaction is complete. If the dropping temperature and the reaction temperature are 20° C. or higher, reaction between the remaining isocyanato groups and the monohydroxy groups progresses rapidly, and if the temperatures are 150° C. or lower, too rapid reaction during the dropping can be prevented.

When the monoisocyanate compound (W) is used, preferably, the molar number of the epoxy carboxylate compound (X) exceeds the molar number of the diisocyanate compound (Y), and the monoisocyanate compound (W) is used in 0.5 to 1.5 times molar amount, and preferably 0.8 to 1.2 times molar amount, relative to the excess molar number of the hydroxyl group. If the molar amount of the monoisocyanate compound (W) is 0.5 times molar amount or more, the hydroxy groups at the end of polyurethane can be reduced, and if the molar amount is 1.5 times molar amount or less, adverse effects to the subsequent steps caused by the remaining unreacted monoisocyanate compound (W) can be prevented.

In order to introduce the monoisocyanate compound (W) to polyurethane, when the reaction between the epoxy carboxylate compound (X) and the diisocyanate compound (Y) is almost complete, in order to make the hydroxyl groups remaining at both ends of the polyurethane react with the monoisocyanate compound (W), the monoisocyanate compound (W) is dropped into the reaction solution at 20 to 150° C., more preferably 50 to 120° C., and thereafter, the same temperature is maintained until the reaction is complete. If the dropping temperature and the reaction temperature are 20° C. or higher, reaction between the remaining hydroxyl groups and the monoisocyanate compound (W) progresses rapidly, and if the temperatures are 150° C. or lower, too rapid reaction during the dropping can be prevented.

The polyurethane as above has a weight average molecular weight of, preferably, 5000 to 40000. The weight average molecular weight is a value measured by a GPC by a method mentioned below.

In the present specification, measurement conditions of the GPC are as mentioned below, unless otherwise noted.
Name of Device: HPLC Unit HSS-2000, manufactured by JASCO Corporation
Column: Shodex Column LF-804
Eluent: tetrahydrofuran
Flow Rate: 1.0 mL/min
Detector: RI-2031Plus, manufactured by JASCO Corporation
Temperature: 40.0° C.
sample Amount: Sample Loop 100 μL
sample Concentration: Prepared to approximately 0.1 mass %

<Polyurethane Resin Composition>

An UV curable polyurethane resin composition may be obtained by adding a photoinitiator, other monomer having a radical polymerizable group in accordance with needs, and preferably a monofunctional/polyfunctional acrylate, to the above-mentioned polyurethane. The additive amount of the monomer is 50 to 300 parts by mass, and preferably 80 to 200 parts by mass, relative to 100 parts by mass of polyurethane.

The amount of the photoinitiator blended to the UV curable polyurethane resin composition is not particularly determined, but preferably 0.5 to 15 parts by mass, and more preferably 1 to 10 parts by mass, relative to 100 parts by mass of polyurethane (when other monomer having a radical polymerizable group is contained, the total sum of polyurethane and other monomer having a radical polymerizable group). If the amount exceeds 15 parts by mass, a large amount of the photoinitiator remains after the UV curing, causing contamination. Whereas, if the amount of less than 0.5 parts by mass, the reaction does not progress sufficiently by the UV irradiation, curing is insufficient, and adhesiveness does not decrease, leading to drawbacks such as pick-up troubles, etc.

The photoinitiator is not limited, but in view of the high reactivity to ultraviolet rays, a photo-radical initiator is preferable. Examples of the photo-radical initiator include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 2,2-diethoxyacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chloro thioxanthone, 2,2-dimethoxy-1,2-diphenylethane-1-on (IRGACURE (registered trademark) 651, manufactured by BASF Japan Ltd.), 1-hydroxy-cyclohexyl-phenyl ketone (IRGACURE (registered trademark) 184, manufactured by BASF Japan Ltd.), 2-hydroxy-2-methyl-1-phenyl propane 1-on (DAROCUR (registered trademark) 1173, manufactured by BASF Japan Ltd.), 1-[4-(2-hydroxyethoxy)-phenyl]-2-hydroxy-2-methyl-1-propane 1-on (IRGACURE (registered trademark) 2959, manufactured by BASF Japan Ltd.), 2-methyl-1-[4-(methylthio)phenyl]-2-morpholino propane 1-on (IRGACURE (registered trademark) 907, manufactured by BASF Japan Ltd.), 2-benzyl-2-dimethylamino-1-(4-morpholino phenyl)-butanone-1 (IRGACURE (registered trademark) 369, manufactured by BASF Japan Ltd.), 2-(4-methyl benzyl)-2-dimethylamino-1-(4-morpholine-4-yl-phenyl)-butane-1-on (IRGACURE (registered trademark) 379, manufactured by BASF Japan Ltd.), dibenzoyl and the like.

Among them, α-hydroxy ketone compounds (for example, benzoin, benzoin methyl ether, benzoin butyl ether, 1-hydroxy-cyclohexyl phenyl ketone, etc.), and phenyl ketone derivatives (for example, acetophenone, propiophenone, benzophenone, 3-methylacetophenone, 4-methylacetophenone, 3-pentylacetophenone, 2,2-diethoxyacetophenone, 4-methoxyacetophenone, 3-bromoacetophenone, 4-allylacetophenone, 3-methoxybenzophenone, 4-methylbenzophenone, 4-chlorobenzophenone, 4,4'-dimethoxybenzophenone, 4-chloro-4'-benzylbenzophenone, bis(4-dimethylaminophenyl)ketone, etc.), are preferable.

Further, as an initiator capable of suppressing the oxygen inhibition on the surface of a cured product, a photo-radical initiator having two or more photodegradable groups in each molecule, or a hydrogen-abstraction-type photo-radical initiator having three or more aromatic rings in each molecule, may be used. Examples of the photo-radical initiator having two or more photodegradable groups in each molecule include 2-hydroxy-1-[4-[4-(2-hydroxy-2-methyl-propionyl)-benzyl]phenyl]-2-methyl-propane-1-on (IRGACURE (registered trademark) 127, manufactured by BASF Japan Ltd.), 1-[4-(4-benzoylphenylsulfanyl)phenyl]-2-methyl-2-(4-methylphenylsulfonyl)propane-1-on (trade name: ESACURE1001M, manufactured by LAMBERTI), methylbenzoylformate (SPEEDCURE (registered trademark) MBF, manufactured by LAMBSON), O-ethoxyimino-1-phenyl propane-1-on (SPEEDCURE (registered trademark) PDO, manufactured by LAMBSON), oligo [2-hydroxy-2-methyl-[4-(1-methylvinyl)phenyl]propanone (trade name: ESACURE KIP150, manufactured by LAMBERTI), and the like. Examples of the hydrogen-abstraction-type photo-radical initiator having three or more aromatic rings in each molecule include [1-(4-phenylsulfanylbenzoyl)heptylideneamino]benzoate, [1-[9-ethyl-6-(2-methylbenzoyl)carbazole-3-yl]ethylideneamino]acetate, 4-benzoyl-4'methyl diphenyl sulphide, 4-phenyl benzophenone, 4,4',4''-(hexamethyltriamino)triphenylmethane, and the like.

Also, a photo-radical initiator characterized to improve depth curability may be used. The photo-radical initiator characterized to improve depth curability may be an acylphosphine oxide-based photo-radical initiator such as 2,4,6-trimethylbenzoyl-diphenyl-phosphine oxide (DAROCUR (registered trademark) TPO, manufactured by BASF Japan Ltd.), bis(2,4,6-trimethylbenzoyl)-phenylphosphine oxide (IRGACURE (registered trademark) 819, manufactured by BASF Japan Ltd.), bis(2,6-dimethylbenzoyl)-2,4,4-trimethyl-pentylphosphine oxide, etc.

In view of the balance between the curability and the storage stability of the polyurethane resin composition according to the present disclosure, a more preferable photo-radical initiator may be 1-hydroxy-cyclohexyl-phenyl-ketone (IRGACURE (registered trademark) 184, manufactured by BASF Japan Ltd.), 2-hydroxy-2-methyl-1-phenyl-propane-1-on (DAROCUR (registered trademark) 1173, manufactured by BASF Japan Ltd.), bis(4-dimethylaminophenyl)ketone, 2-hydroxy-1-[4-[4-(2-hydroxy-2-methyl-propionyl)-benzyl]phenyl]-2-methyl-propane-1-on (IRGACURE (registered trademark) 127, manufactured by BASF Japan Ltd.), 2-benzyl-2-dimethylamino-1-(4-morpholinophenyl)-butanone-1 (IRGACURE (registered trademark) 369, manufactured by BASF Japan Ltd.), 2-(4-methylbenzyl)-2-dimethylamino-1-(4-morpholine-4-yl-phenyl)-butane-1-on (IRGACURE (registered trademark) 379, manufactured by BASF Japan Ltd.), 2,4,6-trimethylbenzoyl-diphenyl-phosphine oxide (DAROCUR (registered trademark) TPO, manufactured by BASF Japan Ltd.), bis (2,4,6-trimethylbenzoyl)-phenylphosphine oxide (IRGACURE (registered trademark) 819, manufactured by BASF Japan Ltd.), bis(2,6-dimethylbenzoyl)-2,4,4-trimethyl-pentylphosphine oxide.

These photo-radical initiators may be used in solo, in combination of two or more kinds, or in combination with other compounds.

Specifically, a combination with other compounds may be a combination with an amine such as 4,4'-bis(dimethylamino) benzophenone, 4,4'-bis(diethylamino)benzophenone, diethanol methyl amine, dimethylethanol amine, triethanol amine, ethyl-4-dimethylamino benzoate, 2-ethylhexyl-4-dimethylamino benzoate, etc., a combination with an amine and an iodonium salt such as diphenyliodonium chloride, etc., and a combination with a dye such as Methylene Blue, etc., and an amine, and the like.

When the photo-radical initiator is used, if needed, a polymerization inhibitor, such as hydroquinone, hydroquinone monomethyl ether, benzoquinone, para-tertiary butyl-catechol, etc., may be added.

Further, a photosensitizer may be blended in the UV curable polyurethane resin composition. The photosensitizer may be triethylamine, tri-n-butylphosphine, and the like.

In addition, a thermal curing initiator may be mixed to the UV curable polyurethane resin composition. The thermal curing initiator may be a conventionally known azo-type or peroxide-type initiator.

When polymerization of a resin layer is performed with UV, in general, an appropriate amount of photoinitiator may be added, and, in accordance with needs, an appropriate amount of photosensitizer may also be added. The photoinitiator may be acetophenone, benzophenone, benzoin, benzoyl benzoate, thioxanthone, etc. The photosensitizer may be triethylamine, tri-n-butylphosphine, etc.

EXAMPLES

Hereinafter, specific examples of the present disclosure will be explained. The examples are described below for the purpose of easy understanding of the present disclosure, and the present disclosure is not limited to these examples.

Synthesis Example 1

A solution prepared by dissolving 138 g of potassium carbonate (manufactured by Nippon Soda, Co., Ltd.) in 125 g of pure water, 228.29 g of bisphenol A (manufactured by Tokyo Chemical Industry Co., Ltd.), and 52.0 g of sodium carbonate (manufactured by Kanto Chemical Co., Inc.) (0.500 mol, in solid state) were added into a 500 mL three-neck round-bottom flask, which is filled by nitrogen, and heated to 85° C. Under a nitrogen flow, 220 g of allyl acetate (manufactured by Showa Denko K.K.), 2.62 g of triphenylphosphine (manufactured by Hokko Chemical Industry Co., Ltd.), and 84.6 mg of 50% wetted-with-water 5%-Pd/C-STD type (manufactured by N.E. CHEMCAT) were added, which was heated to 105° C. and reacted for four hours in a nitrogen atmosphere. Thereafter, 22.0 g of allyl acetate was further added, which were continued to be heated for 12 hours, and, after the reaction was complete, cooled to a room temperature, and then, pure water was added until all of precipitated salt were dissolved. The organic layer was separated, and the organic solvent (70° C., 50 mmHg, 2 hours) was distilled away. Pure water (200 g) was added, and thereafter, 200 g of toluene was added and kept at a temperature of 80° C. or higher, and then, it was confirmed that no white precipitate was found. Then, Pd/C was recovered by filtering (using 1 micron membrane filter (KST-142-JA, manufactured by Advantec Co., Ltd., and applying pressure (0.3 MPa)). The filter residue was washed with 100 g of toluene, and the water layer was separated. The organic layer was washed twice with 200 g of pure water at 50° C. or higher, and then, it was confirmed that the water layer was neutral. The organic layer was separated, and then, condensed under reduced pressure, to thereby obtain a pale yellow liquid (283.76 g, 92.0% percent yield) having bisphenol A diallyl ether as a main component.

Figure 1:
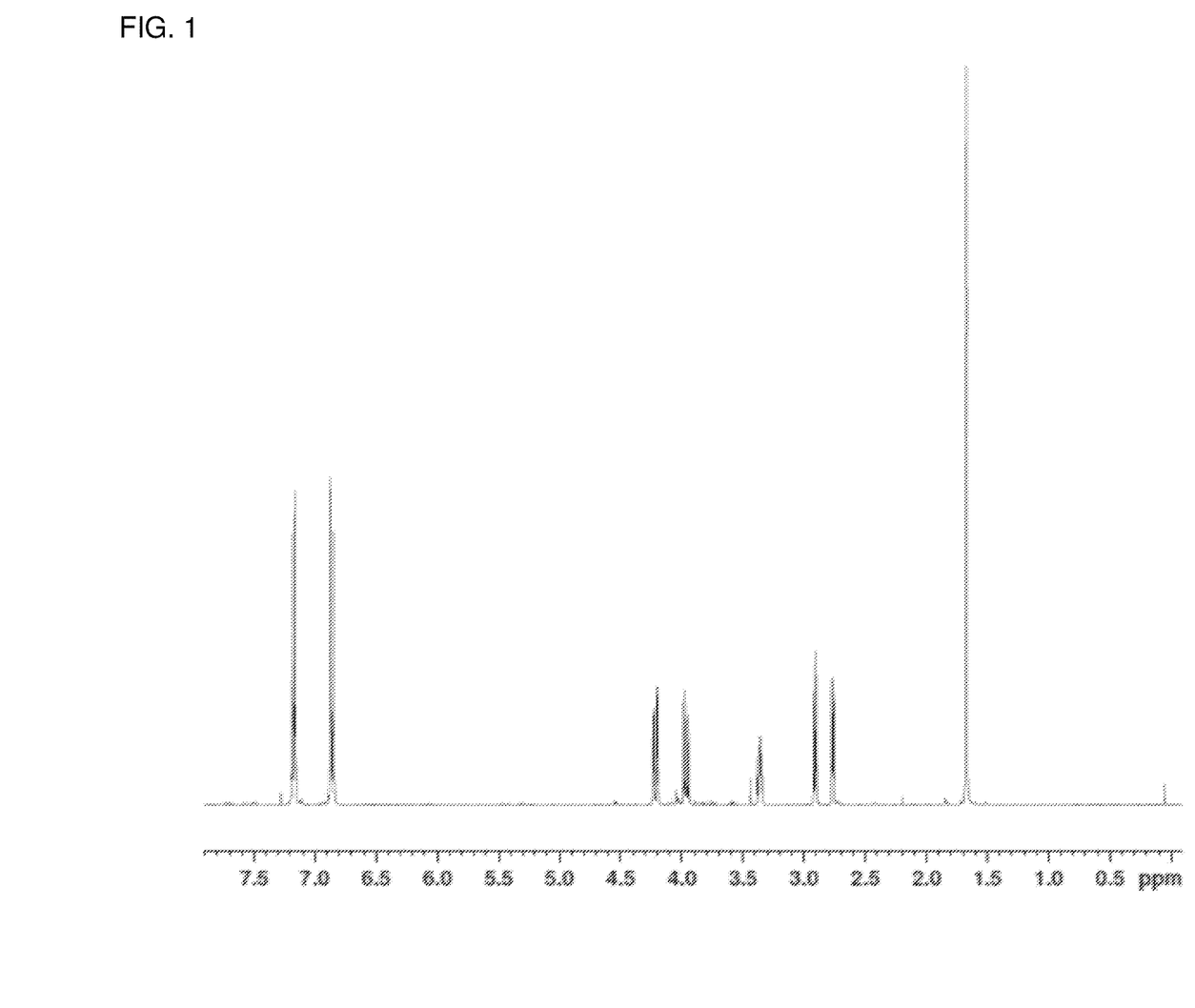
FIG. 1 shows a $^1$H-NMR spectrum of bisphenol A diglycidyl ether (BADG) obtained by Synthesis Example 1.

The obtained 95.7 g of bisphenol A diallyl ether, 259.0 g of methanol, and 130.9 g acetonitrile were added in a flask, and stirred. 399.9 g of hydrogen peroxide (35 mass %) was dropped by a dropping funnel at a speed of approximately 40 g/hr. The mixture was heated to 40° C., and a potassium carbonate aqueous solution (50 mass %) was added thereto, which was reacted at 30 to 40° C. for 12 hours while pH was adjusted to 10 to 11. Using an evaporator, methanol, residual acetonitrile, etc., were distilled away. The reaction liquid, 1.2 L of toluene, 120 ml of 10% sodium sulfate aqueous solution were added to a separating funnel, and subjected to liquid separation treatment. After washing and separating with 200 ml of pure water, 200 ml of 2% sodium sulfite aqueous solution was added, and then, the resultant was subjected to separation treatment. After confirmation that the water layer has a pH of 9 and the potassium iodide-starch test paper was colorless, 200 ml of pure water was further added to the organic layer, the resultant was then subjected to the liquid separation treatment again. After confirmation that the water layer has pH=7, the organic layer was subjected to concentration under reduced pressure until the toluene concentration became 1% or less. The toluene concentration was confirmed through gas chromatography, and thus, halogen-free bisphenol-A diglycidyl ether (hereinafter, expressed as HF-BADG) was synthesized. FIG. 1 shows $^1$H-NMR spectrum of the obtained HF-BADG having an epoxy value of 162.

Synthesis Example 2 (Synthesis of HF-BADG Acrylate)

100 g (0.29 mol) of HF-BADG synthesized in Synthesis Example 1, 0.4 g of phenothiazine (manufactured by Wako Pure Chemical Corporation), and 0.4 g of triphenylphosphine (manufactured by Hokko Chemical Industry Co., Ltd.) were charged in a flask at a room temperature, and stirred, until the temperature was raised to 70° C. at a speed of approximately 5° C./minute. Then, 41.3 g (0.57 mol) of acrylic acid (manufactured by Showa Denko K.K.) was slowly dropped thereto. After the dropping was complete, the temperature was raised to 120° C. at a speed of approximately 5° C./minute, and was maintained at 120° C. During the reaction, stirring was continued. Sampling was performed at appropriate times and the acid values were measured. The reaction was complete when the acid value became 5 or less. This series of reaction was performed in an air atmosphere. As a result, the actual yield was 126.6 g, the percent yield was 89.8%, the acid value was 4.4, and the viscosity was 504 Pa·s.

Figure 2:
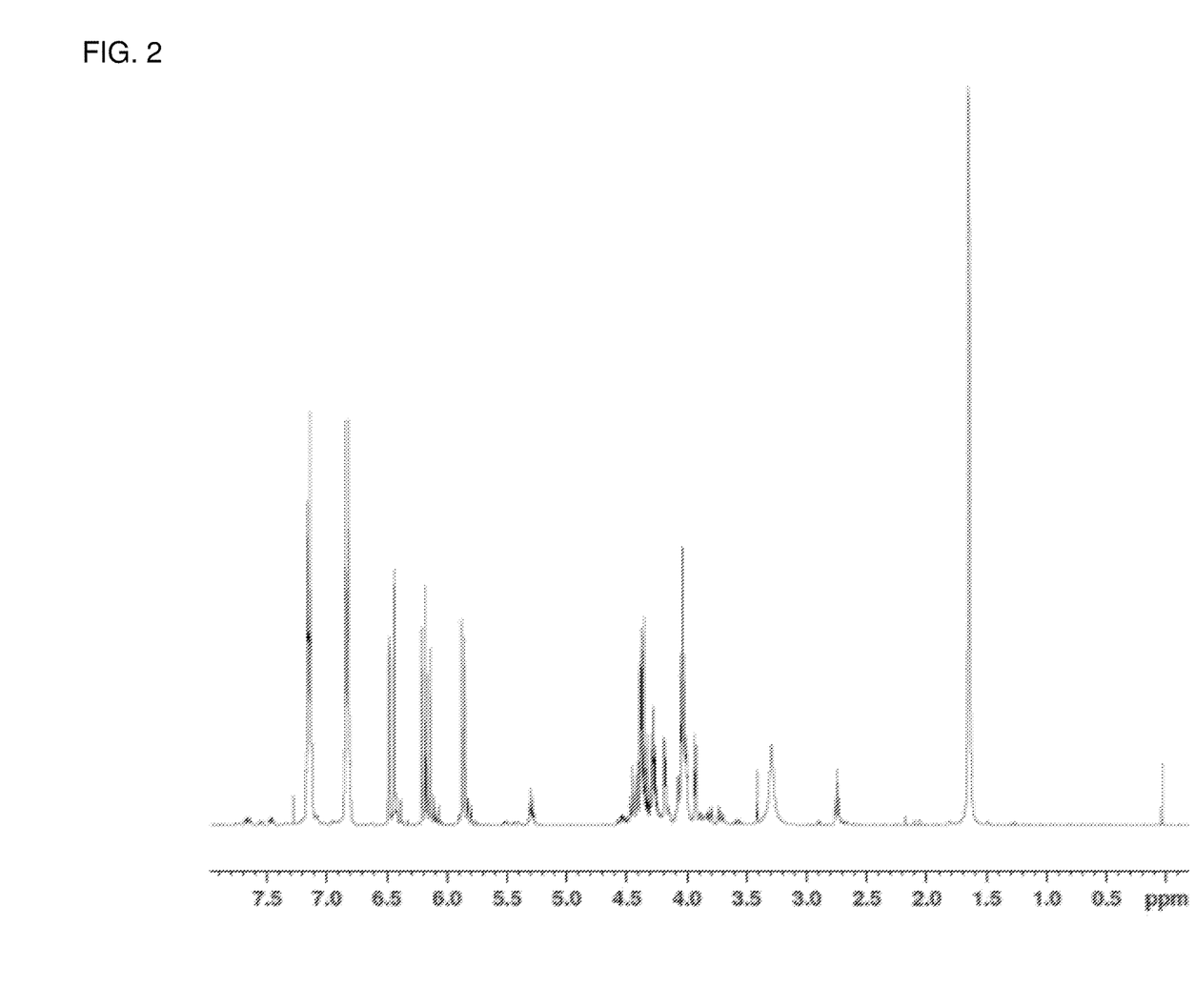
FIG. 2 shows a $^1$H-NMR spectrum of bisphenol A diglycidyl ether (BADG) acrylate obtained by Synthesis Example 2.

The obtained compound was identified by $^1$H-NMR. The result is shown in FIG. 2. Compared to FIG. 1, in FIG. 2, the peak around 2.8 ppm derived from epoxy groups disappears, and a new peak around 6.0 to 6.5 ppm derived from acryloyl groups appears. Thereby, the synthesis of BADG acrylate can be confirmed.

Synthesis Examples 3 to 7: First Step

As shown in Table 1, Synthesis Examples 3 to 5 and 7 were performed under the conditions that a mixture of an acrylic acid and a benzoic acid (Synthesis Example 3 to 5) or a benzoic acid (Synthesis Example 7) was used instead of the acrylic acid, the reaction scale was changed to ½, others were the same as those in Synthesis Example 2. Synthesis Example 6 was performed under the conditions that a marketed product (2,2-bis(4-glycidyloxyphenyl)propane (bisphenol-A diglycidyl ether (BADG))), manufactured by Tokyo Chemical Industry Co., Ltd.) was used instead of the HF-BADG synthesized in Synthesis Example 1, the reaction scale was changed to ½, and others were the same as those in Synthesis Example 2.

In the following explanation, Synthesis Example 3 is used as an example. 50.0 g of HF-BADG synthesized in Synthesis Example 1, 17.45 g of benzoic acid (manufactured by Kanto Chemical Co., Inc.), 0.2 g of phenothiazine (manufactured by Wako Pure Chemical Corporation), 0.3 g of triphenylphosphine (manufactured by Hokko Chemical Industry Co., Ltd.), and 10.4 g propylene glycol monomethyl ether acetate, were charged in a flask, and stirred at 70° C. 10.3 g of acrylic acid (manufactured by Showa Denko K.K.) was slowly dropped thereto. After the dropping was complete, the mixture was heated to the temperature of 120° C., and stirred. Sampling was performed at appropriate times and the acid values were measured. The reaction was complete when the acid value became 5 or less. As a result, the actual yield was 77.2 g, the percent yield was 88%, the acid value was 4.0, the solid concentration was 91.2 mass %, and the viscosity 510 Pa·s.

Synthesis Example 4 was synthesized in the same way as Synthesis Example 3, and as a result the actual yield was 74.0 g, the percent yield was 87%, the acid value was 2.0, the solid concentration was 90.2 mass %, and the viscosity was 550 Pa·s. According to Synthesis Example 5, the actual yield was 82.1 g, the percent yield was 89%, the acid value was 1.9, the solid concentration was 90.6 mass %, and the viscosity was 520 Pa·s. According to Synthesis Example 6, the actual yield was 73.4 g, the percent yield was 90%, the acid value was 1.7, the solid concentration was 89.8 mass %, and the viscosity was 1200 Pa·s. According to Synthesis Example 7, the actual yield was 84.4 g, the percent yield was 88%, the acid value was 3.8, the solid concentration was 91.1 mass %, and the viscosity was 570 Pa·s.

TABLE 1

|  | BADG | Acrylic Acid | Benzoic Acid |
| --- | --- | --- | --- |
| Synthesis Example 2 | Synthesis Example 1 | 41.3 |  |
| Synthesis Example 3 | Synthesis Example 1 | 10.3 | 17.45 |
| Synthesis Example 4 | Synthesis Example 1 | 15.45 | 8.73 |
| Synthesis Example 5 | Synthesis Example 1 | 5.15 | 26.19 |
| Synthesis Example 6 | Marketed Product | 20.65 |  |
| Synthesis Example 7 | Synthesis Example 1 |  | 35 |

Marketed Product: 2,2-bis(4-glycidyloxyphenyl)propane, manufactured by Tokyo Chemical Industry Co., Ltd.

Figure 3:
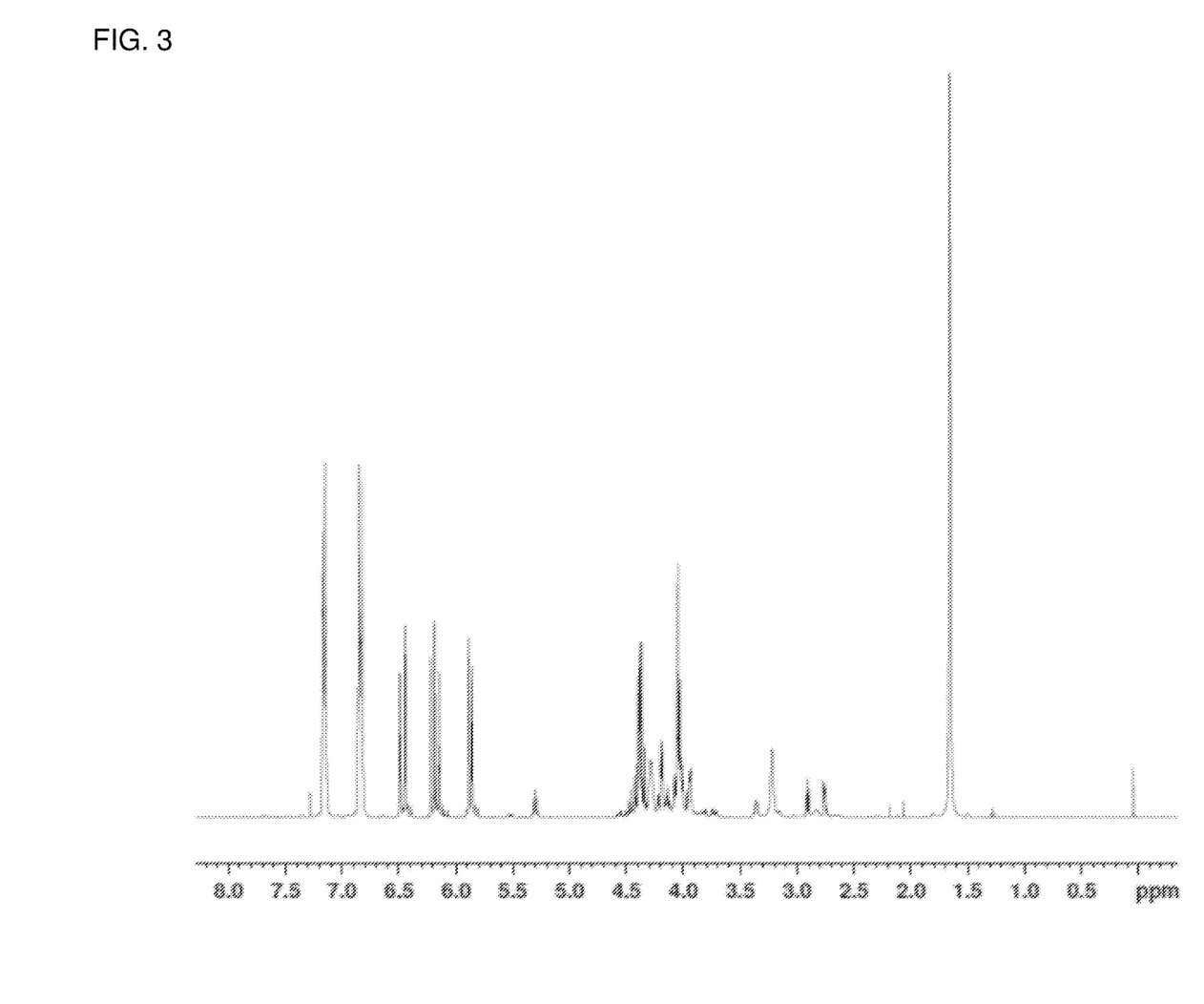
FIG. 3 shows a $^1$H-NMR spectrum of bisphenol A diglycidyl ether (BADG) acrylate obtained by Synthesis Example 6.

With respect to the BADG acrylate produced by Synthesis Example 6, compound characterization was performed by $^1$H-NMR in the same way as Synthesis Example 2. The result is shown in FIG. 3. The peaks around 2.7 to 3.4 ppm are different from the peaks shown in FIG. 2 (BADG acrylate of Synthesis Example 2). Further, compared to each of Synthesis Examples synthesized by carboxylation from BADG according to Synthesis Example 1, the BADG acrylate according to Synthesis Example 6 has an extremely high viscosity. These results suggest that the BADG acrylate obtained by Synthesis Example 6 contains hydroxyl groups other than the hydroxyl groups generated through the calboxylation of the epoxy groups. This is assumed to be because the BADG (marketed product) used in Synthesis Example 6 contains impurities (Formula (4)) mentioned below.

Example 1 (Synthesis of Polyurethane; Second Step)

12.3 g of HF-BADG acrylate synthesized in Synthesis Example 3 (First Step), 0.2 g of Orgatix ZC150 (zirconium tetraacetylacetonate, manufactured by Matsumoto Fine Chemical Co., Ltd.) as a reaction catalyst, and 15.9 g of propylene glycol monomethyl ether acetate were charged in a 300 mL three-neck flask provided with a stirrer, a thermometer, and a condenser, at a room temperature, and stirred. The resultant is heated to 90° C. at a speed of approximately 5° C./minute while a nitrogen gas flow was provided, and maintained at 90° C. 5.5 g of dicyclohexylmethane 4,4'-diisocyanate (Desmodur (registered trademark) W (manufactured by Sumika Covestro Urethane Co., Ltd.) was slowly dropped thereto. After the dropping was complete, the temperature was raised to 110° C. at approximately 5° C./minute, and maintained at 110° C. The reaction was continued for 5 hours. During the reaction, stirring was continued, and the nitrogen gas flow was continuously provided.

The obtained polyurethane 1 had a solid concentration of 55.3%, and a weight average molecular weight of 14000.

Other Examples 2 and 3, and Comparative Examples 1, 2, and 4 were performed in the same way as Example 1 except that HF-BADG acrylate and the mass thereof according to Synthesis Example 3 which was used in Example 1, was changed as described in Table 2. The BADG (bisphenol-A diglycidyl ether) acrylate used Comparative Example 3 was Viscoat #540 manufactured by Osaka Organic Chemical Industry Ltd.

Polyurethane 2 obtained by Example 2 had a solid concentration of 54.2%, and a weight average molecular weight of 13500. Polyurethane 3 obtained by Example 3 had a solid concentration of 55.5%, and a weight average molecular weight of 15000. Polyurethane 4 obtained by Comparative Example 2 had a solid concentration of 53.8%, and a weight average molecular weight of 16000. Polyurethane 5 obtained by Comparative Example 4 had a solid concentration of 52.1%, and a weight average molecular weight of 14500.

TABLE 2

| BADG Carboxylate | Synthesis Example 2 | Synthesis Example 3 | Synthesis Example 4 | Synthesis Example 5 | Synthesis Example 6 | Synthesis Example 7 | Marketed Product |
|---|---|---|---|---|---|---|---|
| Example 1 | | 12.3 g | | | | | |
| Example 2 | | | 11.8 g | | | | |
| Example 3 | | | | 12.9 g | | | |
| Comparative Example 1 | | | | | 11.2 g | | |
| Comparative Example 2 | | | | | | 13.5 g | |
| Comparative Example 3 | | | | | | | 11.2 g |
| Comparative Example 4 | 11.2 g | | | | | | |

Marketed Product: Viscoat #540 manufactured by Osaka Organic Chemical Industry Ltd.

In Examples 1 to 3, and Comparative Examples 2 and 4, gelation did not occur, and polyurethane was obtained. In Comparative Examples 1 and 3, gelation occurred and polyurethane could not be obtained.

In general, a marketed BADG is synthesized using epichlorohydrin and bisphenol A as raw materials. The marketed BADG contains a by-product generated at the time of synthesis, which is a dimer represented by the following Formula (4).

(4)

Therefore, the BADG acrylate used in Comparative Example 1 contains an impurity having three hydroxyl groups, which is represented by the following Formula (5).

(5)

As a result, it is assumed that during the polyaddition reaction in the Second Step, a cross-linking reaction occurred which causes gelation, and thus, it is thought that linear polyurethane could not be obtained. The impurity represented by Formula (5) can be confirmed by $^1$H-NMR spectrum shown in FIG. 3.

Further, it is clearly described that the marketed BADG acrylate used in Comparative Example 3 contains a dimer, and thus, contains a compound having three hydroxyl groups. Thus, similarly, it is thought that it accompanied gelation.

In Comparative Example 4, HF-BADG obtained by Synthesis Example 2 was used. The main component of the HF-BADG was the same as the acrylate used in Comparative Example 1 and Comparative Example 3, but a smaller amount of by-product was contained in the raw material BADG. Thus, gelation did not occur at the time of the urethanation.

With respect to the polyurethane obtained from Examples 1 to 3 and Comparative Examples 2 and 4, coated film evaluation was performed. The results are shown in Table 3.

Each polyurethane was diluted with propylene glycol monomethyl ether acetate so that the viscosity measured by the E-type viscometer at 25° C. became approximately 3000 mPa·s. Relative to 100 parts by mass of the obtained dilution, 5 parts by mass of a photoinitiator, i.e., Irgacure (registered trademark) 184 (manufactured by BASF), was added. The resultant was mixed well using Planetary Centrifugal Vacuum Mixer Awatori Rentaro (registered trademark) ARV-310 (manufactured by Thinky Corporation) (500 rpm of rotation and 1500 rpm of revolution for 5 minutes), and thus, an ink for coating was obtained.

For a substrate, PET (Lumirror (registered trademark) T60 (manufactured by Toray Industries, Inc.)) was used. Each ink was coated on this substrate film using a bar coater (No20), dried at 80° C. for 30 minutes, and then, exposed to a high-pressure mercury lamp in a nitrogen gas atmosphere (illuminance 18 mW/cm$^2$, at wavelength 365 nm) for 120 seconds, to thereby cure the polyurethanel, and form a cured product, i.e., cured film, on the substrate film. The cured film had a film thickness of approximately 15 μm.

Urethanation:
  Good: Synthesized with no problem
  Bad: Gelation
Adhesion after being Cured:
  Cross-Cut Test compliant with JIS K7600 was performed, and adhesiveness was determined on the basis of the following criteria.
  Good: No peeling in peel strength test
  Fair: Partly peeled
  Bad: Entirely peeled
Warpage after being Cured:
  The substrate film on which the cured film was coated, was cut into 100-mm-square, and placed with the printed face upside. Warpage was determined on the basis of the following criteria.
  Good: Difference between the end portion and the horizontal portion being within 2 mm
  Fair: Within 5 mm
  Bad: Exceeding 5 mm
Acetone Resistance after being Cured:
  1 ml of acetone was dropped by a syringe on the cured film, and five minutes later, wiped off with a waste cloth and air-dried. The appearance of the resultant coated film was determined on the basis of the following criteria.
  Good: No dissolution
  Fair: Partial dissolution (white turbidity, etc.)
  Bad: Dissolved

TABLE 3

| | Raw Material BADG | | BADG Carboxylate | | | | Urethane Evaluation | | | | |
|---|---|---|---|---|---|---|---|---|---|---|---|
| | | Halogen atom content (mass ppm) | | Halogen atom content (mass ppm) | Acrylic acid (mol %) | Benzoic acid (mol %) | Halogen atom content (mass ppm) | Urethanation | Adhesion after being cured | Warpage after being cured | Acetone resistance after being cured |
| Example 1 | Synthesis Example 1 | 7.9 | Synthesis Example 3 | 7.4 | 50 | 50 | 22.1 | Good | Good | Good | Good |
| Example 2 | Synthesis Example 1 | 7.9 | Synthesis Example 4 | 7.2 | 75 | 25 | 24.4 | Good | Good | Fair | Good |
| Example 3 | Synthesis Example 1 | 7.9 | Synthesis Example 5 | 7.1 | 25 | 75 | 23.8 | Good | Good | Good | Fair |
| Comparative Example 1 | Marketed Product | 1405 | Synthesis Example 6 | 1404 | 100 | 0 | —* | Bad | — | — | — |
| Comparative Example 2 | Synthesis Example 1 | 7.9 | Synthesis Example 7 | 6.9 | 0 | 100 | 25.2 | Good | Good | Good | Bad |
| Comparative Example 3 | — | — | Marketed Product | 1306 | 100 | 0 | —* | Bad | — | — | — |
| Comparative Example 4 | Synthesis Example 1 | 7.9 | Synthesis Example 2 | 7.5 | 100 | 0 | 24.0 | Good | Fair | Bad | Good |

*Measurement was impossible because polyurethane was not dissolved in the solvent.

In Table 3, the symbol "-" shown in the sections for adhesion after being cured, warpage after being cured, and acetone resistance after being cured, regarding Comparative Examples 1 and 3, indicates that the relevant item was not evaluated because polyurethane was not obtained.

The invention claimed is:

1. A method for producing polyurethane comprising: a first step of obtaining an epoxy carboxylate compound (X) by reacting an epoxy compound (a) including a halogen atom of 10 mass ppm or less and having only two epoxy groups and no hydroxyl group in each molecule, an unsaturated aliphatic monocarboxylic acid (b) having an ethylenic unsaturated group and no aromatic ring in each molecule, and an aromatic monocarboxylic acid (c) having no ethylenic unsaturated group in each molecule; and a second step of reacting the epoxy carboxylate compound (X) obtained in the first step with a diisocyanate compound (Y); and the ratio of the aromatic monocarboxylic acid (c) having no ethylenic unsaturated group in each molecule, relative to the sum of the unsaturated aliphatic monocarboxylic acid (b) having an ethylenic unsaturated group and having no aromatic ring in each molecule and the aromatic monocarboxylic acid (c) having no ethylenic unsaturated group in each molecule, is 20 to 80 mol %.

2. A method for producing polyurethane according to claim 1, wherein, in the first step, reaction is performed under conditions that: the sum of carboxyl groups in the unsaturated aliphatic monocarboxylic acid (b) having an ethylenic unsaturated group and no aromatic ring in each molecule and the aromatic monocarboxylic acid (c) having no ethylenic unsaturated group in each molecule is 0.9 to 1.2 equivalents, relative to 1 equivalent of epoxy groups in the epoxy compound (a).

3. A method for producing polyurethane according to claim 1, wherein, in the second step, a number of isocyanato groups in the diisocyanate compound (Y):a number of hydroxyl groups in the epoxy carboxylate compound (X) is 0.5 to 1.5:1.

4. A method for producing polyurethane according to claim 1, wherein said epoxy compound (a) is an aromatic diglycidyl ether including a halogen atom content of 10 mass ppm or less.

5. A method for producing polyurethane according to claim 4, wherein said aromatic diglycidyl ether is bisphenol A diglycidyl ether.

6. A method for producing polyurethane according to claim 1, wherein said unsaturated aliphatic monocarboxylic acid (b) having an ethylenic unsaturated group and no aromatic ring in each molecule is one selected from a group consisting of a (meth)acrylic acid, a crotonic acid, a reaction product of a (meth)acrylic acid with ε-caprolactone, and a half ester which is an equimolar reaction product of a saturated or unsaturated dibasic acid anhydride having no aromatic ring in each molecule with a (meth)acrylate derivative having only a hydroxyl group in each molecule.

7. A method for producing polyurethane according to claim 1, wherein said aromatic monocarboxylic acid (c) having no ethylenic unsaturated group in each molecule is a monocarboxylic acid having an aromatic skeleton with a carbon atom number of 6 to 30.

8. A method for producing polyurethane according to claim 1, wherein said diisocyanate compound (Y) comprises an alicyclic compound having 6 to 30 carbon atoms except for isocyanato group (—NCO group).

9. Polyurethane comprising a first urethane bond unit between a first epoxy carboxylate compound represented by the following formula (1) and a diisocyanate compound (Y), and a second urethane bond unit between a second epoxy carboxylate compound represented by the formula (1) and the diisocyanate compound (Y)

(in the formula, A represents an organic residue derived from a diglycidyl ether and having no hydroxyl group; and $R^1$, $R^2$ each independently represents an aromatic ring which has a carbon atom number of 6 to 30 and may have a substituent, or an organic group represented by the formula (2);

in the first epoxy carboxylate compound, at least one of $R^1$ and $R^2$ being an aromatic ring which has a carbon atom number of 6 to 30 and may have a substituent;

in the second epoxy carboxylate compound, at least one of $R^1$, $R^2$ being an organic group represented by the formula (2); and the first epoxy carboxylate compound being different from the second epoxy carboxylate compound);

$$H_2C=CR^3— \quad (2)$$

(in the formula, $R^3$ represents a hydrogen atom or a methyl group).

10. A polyurethane resin composition comprising the polyurethane according to claim 9 and a photoinitiator.

11. The method for producing, polyurethane according to claim 1, wherein the unsaturated aliphatic monocarboxylic acid (b) contains no hydroxyl group in a molecule; the aromatic monocarboxylic acid (c) contains no hydroxyl group in a molecule; and in the second step, the epoxy carboxylate compound (X) obtained in the first step is reacted with the diisocyanate compound (Y), in the absence of a polyol component having three or more hydroxyl groups in a reaction system.

12. The method for producing, polyurethane according to claim 1, wherein the ratio of (c) aromatic monocarboxylic acid in a total amount of the unsaturated aliphatic monocarboxylic acid (b) and aromatic monocarboxylic acid (c) is 25 to 75 mol %.

13. Polyurethane according to claim 9, wherein the polyurethane has no urethane bond unit between a polyol component having three or more hydroxyl groups and the diisocyanate compound (Y); and the substituent is an alkyl group with carbon atom number of 1 to 6 or an alkoxy group with carbon atom number of 1 to 6.

* * * * *